United States Patent
Ugas Gonzalez (10) Patent No.: US 11,892,284 B2
(45) Date of Patent: Feb. 6, 2024

(54) SPROCKET WEAR GAUGE

(71) Applicant: INTELLIGRATED HEADQUARTERS, LLC, Mason, OH (US)

(72) Inventor: Ricardo Ugas Gonzalez, Mason, OH (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 515 days.

(21) Appl. No.: 17/185,094

(22) Filed: Feb. 25, 2021

(65) Prior Publication Data
US 2022/0268563 A1   Aug. 25, 2022

(51) Int. Cl.
*G01B 3/34* (2006.01)
*F16H 57/01* (2012.01)
*F16H 55/30* (2006.01)

(52) U.S. Cl.
CPC .............. *G01B 3/34* (2013.01); *F16H 57/01* (2013.01); *F16H 55/30* (2013.01); *F16H 2057/012* (2013.01)

(58) Field of Classification Search
CPC .................................. G01B 3/34; F16H 57/01
USPC .... 33/501.7, 501.11, 501.12, 501.14, 501.16
See application file for complete search history.

(56) References Cited

U.S. PATENT DOCUMENTS

| | | | | |
|---|---|---|---|---|
| 2,561,533 A | * | 7/1951 | Parker | G01B 5/20 33/501.11 |
| 2,716,554 A | * | 8/1955 | Lowe | B23B 31/025 279/123 |
| 3,172,210 A | * | 3/1965 | Showers, Jr. | G01B 5/20 33/501.11 |
| 3,845,564 A | * | 11/1974 | Morgan | G01B 3/18 33/816 |
| 4,062,125 A | * | 12/1977 | Maag | G01B 5/202 33/501.14 |
| 4,185,391 A | * | 1/1980 | Roley | G01B 5/202 33/501.7 |
| 4,769,917 A | * | 9/1988 | Bertz | G01B 5/202 33/DIG. 1 |
| 4,962,590 A | * | 10/1990 | Ambrose | G01M 13/021 33/501.14 |
| 5,348,515 A | | 9/1994 | Miller | |
| 5,461,797 A | * | 10/1995 | Royer | G01B 5/202 33/501.7 |
| 7,018,313 B2 | | 3/2006 | Nakamura | |
| 7,730,627 B2 | * | 6/2010 | Mashue | G01M 13/021 33/501.7 |

(Continued)

*Primary Examiner* — George B Bennett
(74) *Attorney, Agent, or Firm* — Alston & Bird LLP (57) ABSTRACT

Various embodiments illustrated herein disclose a sprocket wear gauge. The sprocket wear gauge comprises a first plate having a first opening of a first diameter and a second plate having a second opening of a second diameter. The first plate is mounted on one end of adjacent sprocket teeth of a plurality of sprocket teeth of a sprocket wheel. The second plate is mounted on an opposite end of the adjacent sprocket teeth of a plurality of sprocket teeth of a sprocket wheel. The first plate and the second plate are attached to each other using screws. A cylindrical pin is placed between the adjacent sprocket teeth and is configured to pass through at least one of the first opening of the first plate and the second opening of the second plate.

20 Claims, 8 Drawing Sheets

(56) References Cited

U.S. PATENT DOCUMENTS

| | | | |
|---|---|---|---|
| 9,719,767 B2* | 8/2017 | Knäbel | G01B 5/24 |
| 10,703,441 B2* | 7/2020 | Dos Santos | B62M 1/36 |
| 10,753,893 B2* | 8/2020 | Harrington | G01N 25/00 |
| 10,914,368 B2* | 2/2021 | Chen | F16H 25/2204 |
| 11,525,498 B2* | 12/2022 | Mochizuki | F16H 25/20 |
| 2003/0140709 A1 | 7/2003 | Frost | |
| 2015/0033570 A1* | 2/2015 | Bernabe | G01B 3/34 |
| | | | 33/555.1 |
| 2020/0386783 A1* | 12/2020 | Hemelsdael | B64F 5/10 |

\* cited by examiner

SPROCKET WEAR GAUGE

TECHNICAL FIELD

Example embodiments of the present disclosure relate generally to a sprocket wear gauge, and a method of determining the wear of sprocket teeth.

BACKGROUND

A sprocket wheel engaged by a roller chain or a roller track comprises a plurality of sprocket teeth which come in constant contact with a plurality of rollers of the roller chain. The plurality of sprocket teeth are spaced apart from each other around a periphery of the sprocket wheel to engage with the plurality of rollers. Each sprocket tooth of the plurality of sprocket teeth has predetermined dimensions and a characteristic profile. The predetermined dimensions and the characteristic profile of each sprocket tooth undergo change as each sprocket tooth of the plurality of sprocket teeth is worn down due to the constant contact between the sprocket teeth and the plurality of rollers of the roller chain.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION OF THE INVENTION

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details.

Various embodiments disclosed herein provide for a sprocket wear gauge that can be mounted on a sprocket wheel having a plurality of sprocket teeth. The sprocket wear gauge can comprise a first/front plate having a first opening of a first diameter and a second/back plate having a second opening of a second diameter. The first diameter of the first opening can be greater than the second diameter of the second opening. Distance between at least two or more adjacent sprocket teeth can be less than one or more of the first diameter of the first opening of the first plate and the second diameter of the second opening of the second plate. The first plate of the sprocket wear gauge can be placed adjacent to one face of at least two or more adjacent sprocket teeth of the plurality of the sprocket teeth. The second plate of the sprocket wear gauge can be placed adjacent to an opposite face of the at least two or more adjacent sprocket teeth of the plurality of the sprocket teeth. A cylindrical pin can be configured to pass between at least two or more adjacent sprocket teeth of the plurality of sprocket teeth, the first opening of the first plate, and the second opening of the second plate. The cylindrical pin passing through the first opening of the first plate and not passing through the second opening of the second plate can indicate that the plurality of sprocket teeth have not yet experienced a predetermined amount of wear. The cylindrical pin passing through the first opening of the first plate and the second opening of the second plate can indicate that the plurality of sprocket teeth have experienced a predetermined amount of wear. The first opening of the first plate and the second opening of the second plate of the sprocket wear gauge can accurately indicate the predetermined amount of wear in the plurality of sprocket teeth. Based on the position of the cylindrical pin, the sprocket wear gauge can determine the predetermined amount of wear and whether the sprocket wheel needs to be replaced. The use of the sprocket wear gauge can effectively mitigate risks of the rollers of the roller chain skipping the plurality of sprocket teeth, rapid increase in sprocket wear over a remaining life-period of the sprocket wheel, and unpredictable down time due to sprocket teeth wear.

In an embodiment, the sprocket wear gauge can be a go/no go gauge that can quickly be used to identify whether a sprocket has wear within an allowed tolerance via a go/no go test.

In some embodiments, the first diameter of the first opening of the first plate and the second diameter of the second opening of the second plate can be equal.

In some embodiments, the predetermined amount of wear can be measured by an indentation depth caused by the plurality of rollers of the roller chain, wherein the plurality of rollers of the roller chain can engage with the plurality of sprocket teeth of the sprocket wheel. In other embodiments, the indentation depth caused by the plurality of rollers of the roller chain can be determined visually. In yet some other embodiments, the indentation depth can be measured as a polished worn strip, wherein a width of the polished worn strip is measured along a pitch circle diameter of the sprocket wheel, wherein the pitch circle diameter is a diameter of a circle passing through all sprocket teeth of the plurality of sprocket teeth.

In some embodiments, the sprocket wheel can be replaced when the indentation depth reaches a value which is equal to 10 percent of tooth width, wherein the tooth width is a width of a sprocket tooth of the plurality of sprocket teeth measured at the theoretical pitch diameter of the sprocket wheel. In other embodiments, the sprocket wheel can be replaced when the indentation depth reaches any other predetermined value based on the tooth width.

In some embodiments, the indentation depth can be measured on a distance between adjacent teeth of the plurality of teeth of the sprocket wheel. In other embodiments, the indentation depth can be measured on any other parameter of the plurality of sprocket teeth of the sprocket wheel.

In some embodiments, the first plate and the second plate of the sprocket wear gauge can be identical in shape. In other embodiments, an outer dimension of the first plate and the outer dimension of the second plate can be identical.

In some embodiments, the first plate and the second plate of the sprocket wear gauge can comprise one or more holes through which one or more screws can be inserted to secure the first plate and the second plate to each other. In other embodiments, the first plate and the second plate of the sprocket wear gauge can be partially secured by inserting the one or more screws before mounting the sprocket wear gauge on the sprocket wheel and then the first plate and the second plate of the sprocket wear gauge can be fully secured by screwing in the one or more screws after mounting the sprocket wear gauge on the sprocket wheel. In some other embodiments, the sprocket wheel comprising the plurality of teeth can be cleaned to remove any debris, dust particles, and dirt before mounting the sprocket wear gauge to the sprocket wheel.

In some embodiments, one of the first plate and the second plate of the sprocket wear gauge can be designed with one or more cylindrical extrusions. The one or more cylindrical extrusions can coincide with a slope of the adjacent sprocket teeth the plurality of sprocket teeth. The one or more cylindrical extrusions can position the sprocket wear gauge on a specific area of the plurality of sprocket teeth to be tested. The one or more cylindrical extrusions can be equidistant from a center of the sprocket wear gauge and equidistant from each other to facilitate a proper alignment of the sprocket wear gauge. In other embodiments, the one or more cylindrical extrusions of the sprocket wear gauge can be identical in outer dimension and shape to the rollers of the roller chain which engage the plurality of sprocket teeth of the sprocket wheel.

In some embodiments, the first opening of the first plate and the second opening of the second plate can be circular in shape. In yet some other embodiments, one or more of the first opening of the first plate and the second opening of the second plate can be oval in shape. When the sprocket wear gauge is mounted on the sprocket wheel, the oval shape of the one or more of the first opening of the first plate and the second opening of the second plate can outline a wear region of one or more sprocket teeth of the plurality of sprocket teeth of the sprocket wheel. In other embodiments, the oval shape of the one or more of the first opening of the first plate and the second opening of the second plate can outline one or more wear regions in one or more sprocket wheels placed in proximity of each other, such that the one or more sprockets have a common central axis of rotation. In some other embodiments, the oval shape of the one or more of the first opening of the first plate and the second opening of the second plate can outline one or more wear regions in one or more sprockets that face each other in opposite directions in a confined space, such as sprockets installed in the drive or idler section of a sliding shoe sorter.

In some embodiments, the one or more of the first opening of the first plate and the second opening of the second plate can be elliptical in shape. In other embodiments, the one or more of the first opening of the first plate and the second opening of the second plate can have any other shape.

In some embodiments, the sprocket wear gauge can comprise a conventional cylindrical pin used to check a maximum hole diameter of one or more openings in a plate.

Figure 1:
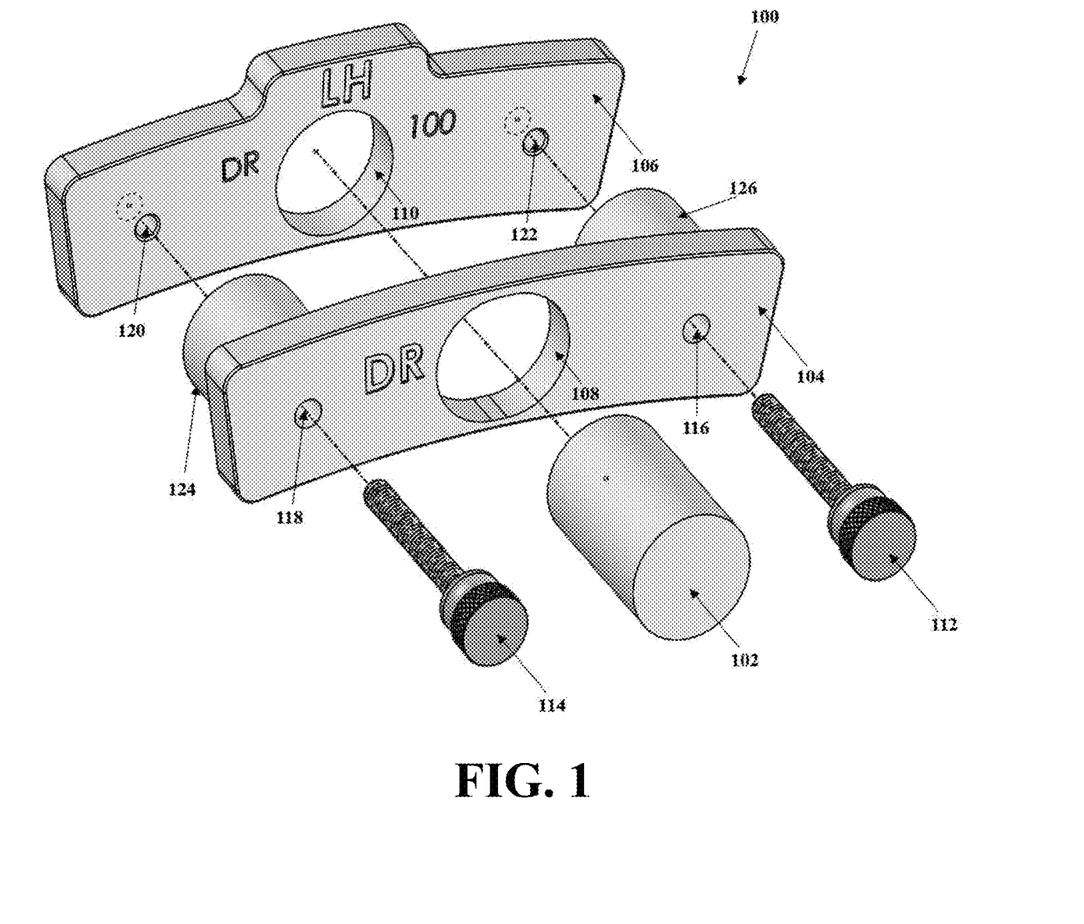
FIG. 1 illustrates an exemplary exploded view of a sprocket wear gauge, according to one or more embodiments described herein.

FIG. 1 illustrates an exemplary exploded view of a sprocket wear gauge for a drive sprocket wheel at 100 percent wear, according to one or more embodiments described herein. The sprocket wear gauge for a drive sprocket wheel at 100 percent wear can comprise a first plate 104, a second plate 106, and a cylindrical pin 102. The first plate 104 and the second plate 106 can further comprise a first opening 108 of a first diameter and a second opening 110 of a second diameter respectively. The first plate 104 and the second plate 106 can be mounted on a sprocket wheel, such that the first plate 104 and the second plate 106 are placed on opposite faces of a plurality of sprocket teeth of the sprocket wheel. The first diameter of the first opening 108 of the first plate 104 can be greater than the second diameter of the second opening 110 of the second plate 106. The first diameter of the first opening 108 of the first plate 104 and the second diameter of the second opening 110 of the second plate 106 can be greater than a predetermined distance between adjacent sprocket teeth of the plurality of sprocket teeth of the sprocket wheel. The cylindrical pin 102 can be inserted through the first opening 108 of the first plate 104 and the second opening 110 of the second plate 106 such that the cylindrical pin 102 passes between the adjacent sprocket teeth of the plurality of sprocket teeth of the sprocket wheel.

In some embodiments, diameter of the cylindrical pin 102 can be less than the first diameter of the first opening 108, the second diameter of the second opening 110, and the predetermined distance between the adjacent sprocket teeth of the plurality of sprocket teeth such that the cylindrical pin 102 can be positioned between the adjacent sprocket teeth of the plurality of sprocket teeth. Further, the cylindrical pin 102 can be configured to be placed between the adjacent sprocket teeth such that the cylindrical pin 102 is visible to a user. When the adjacent sprocket teeth are symmetrically visible on either side of the cylindrical pin 102 such that the cylindrical pin 102 is centrally placed between the adjacent sprocket teeth, the user can determine that the adjacent sprocket teeth have not experienced a predetermined amount of wear. When the adjacent sprocket teeth are not symmetrically visible on either side of the cylindrical pin 102, such that the cylindrical pin 102 is not centrally placed between the adjacent sprocket teeth, the user can determine that the adjacent sprocket teeth have experienced the predetermined amount of wear and can replace the sprocket wheel.

In some embodiments, when the adjacent sprocket teeth are symmetrically visible on either side of the cylindrical pin 102, the cylindrical pin 102 does not come in contact with the first opening 108 of the first plate 104 of the sprocket wear gauge 100. When the adjacent sprocket teeth are not symmetrically visible on either side of the cylindrical pin 102, the cylindrical pin 102 can come in contact with the first opening 108 of the first plate 104 of the sprocket wear gauge 100. In some embodiments, the cylindrical pin 102 can come in contact with a left-hand side of the first opening 108 of the first plate 104 when a left-hand side sprocket tooth of the adjacent sprocket teeth has experienced a predetermined amount of wear. Conversely, the cylindrical pin 102 can come in contact with a right-hand side of the first opening 108 of the first plate 104 when a right-hand side sprocket tooth of the adjacent sprocket teeth has experienced a predetermined amount of wear.

In some embodiments, the cylindrical pin 102 can be configured such that the cylindrical pin 102 does not pass through the second opening 110 of the second plate 106 when the adjacent sprocket teeth have not experienced the predetermined amount of wear. Conversely, the cylindrical pin 102 can be configured such that the cylindrical pin 102 passes through the second opening 110 of the second plate 106 when the adjacent sprocket teeth have experienced the predetermined amount of wear on one or more of the left-hand side sprocket tooth and the right-hand side sprocket tooth of the adjacent sprocket teeth.

In some embodiments, the first plate 104 can comprise cylindrical extrusions, such as 124 and 126. The cylindrical extrusions 124, 126 can be configured to be equidistant from the first opening 108 of the first plate 104. The cylindrical extrusions 124 and 126 can be configured to be placed between at least two pairs of adjacent sprocket teeth of the plurality of sprocket teeth of the sprocket wheel, such that the first opening 108 of the first plate 104 coincides with a test area of the plurality of sprocket teeth of the sprocket wheel. The test area of the plurality of sprocket teeth of the sprocket wheel can be any area with adjacent sprocket teeth. In some embodiments, the test area of the plurality of sprocket teeth of the sprocket wheel can be an area with adjacent sprocket teeth having visible damage and sprocket wear.

In some embodiments, the first plate 104 and the second plate 106 can be attached to each other using one or more screws, such as 112 and 114. The screws 112 and 114 can be inserted through holes such as 118, 116 in the first plate 104 and holes 120, 122 in the second plate 106 to attach the first plate 104 and the second plate 106 to each other.

In some embodiments, the first plate 104 and the second plate 106 can be identical in shape and outer dimensions. In other embodiments, the shape and the outer dimensions of the first plate 104 and the second plate 106 can be different. In some other embodiments, the first plate 104 and the second plate 106 can comprise of aluminum. In yet some other embodiments, the first plate 104 and the second plate 106 can comprise of any other suitable material, such as any other metal, composite material, and the like.

Figure 2:
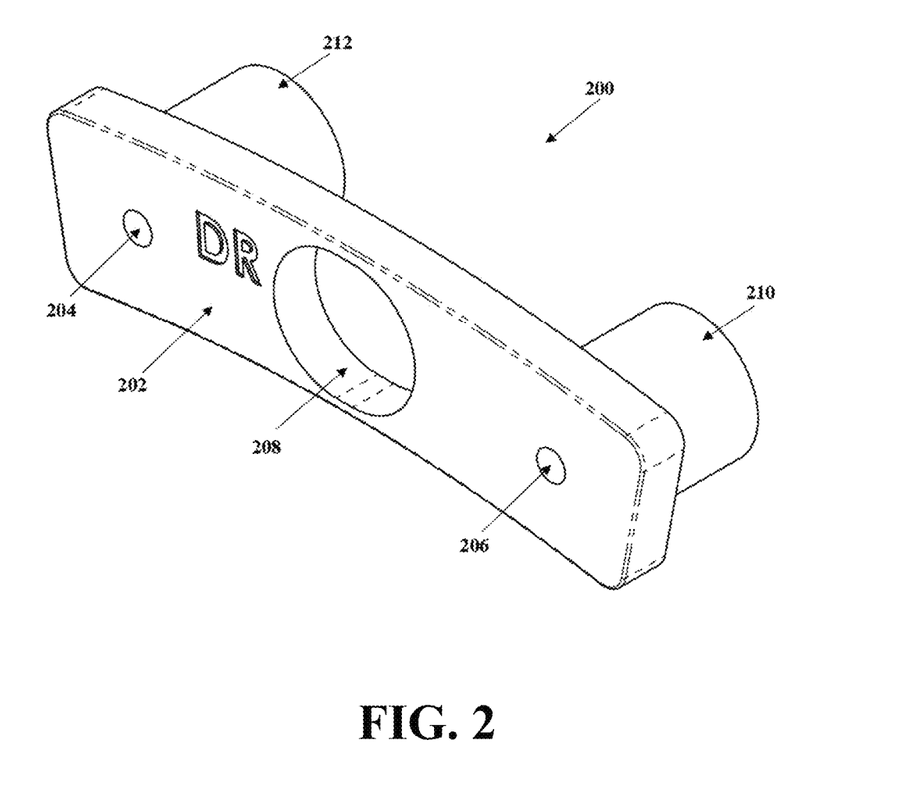
FIG. 2 illustrates an exemplary perspective view of a front plate of a sprocket wear gauge, according to one or more embodiments described herein.

FIG. 2 illustrates an exemplary perspective view of a first plate 202 of a sprocket wear gauge 200, according to one or more embodiments described herein. The first plate 202 of the sprocket wear gauge 200 can comprise of a first opening 208 of a first diameter. The first plate 202 can be mounted on a sprocket wheel having a plurality of sprocket teeth, such that the first plate 202 coincides with one face of adjacent sprocket teeth of the plurality of sprocket teeth. A cylindrical pin having a diameter less than the first diameter of the first opening 208 can be configured to pass through the first opening 208 and pass between the adjacent sprocket teeth of the plurality of sprocket teeth. The first plate 202 can further comprise one or more holes such as 204, 206 to receive one or more screws or any other kind of fasteners. In some embodiments, the first plate 202 can comprise one or more cylindrical extrusions such as 210, 212 which can be placed between adjacent sprocket teeth of the plurality of sprocket teeth. The cylindrical extrusions 210, 212 can be equidistant from the first opening 208 of the first plate 202.

In some embodiments, the first plate 202 can be a front plate of the sprocket wear gauge 200.

Figure 3:
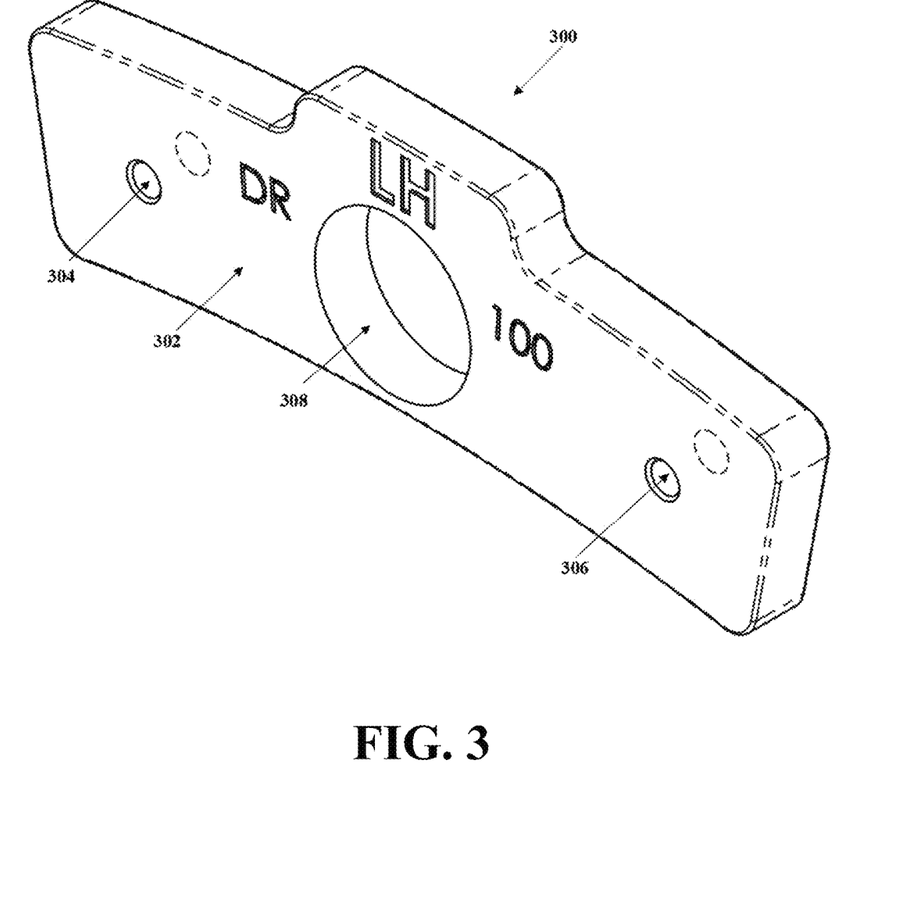
FIG. 3 illustrates an exemplary perspective view of a back or rear plate of a sprocket wear gauge, according to one or more embodiments described herein.

FIG. 3 illustrates an exemplary perspective view of a second plate 302 of a sprocket wear gauge 300, according to one or more embodiments described herein. The second plate 302 can comprise of a second opening 308 of a second diameter. The second plate 302 can further comprise of one or more holes such as 304, 306 to receive one or more screws or any other kind of fasteners.

In some embodiments, the second plate 302 can be a back plate of the sprocket wear gauge 300.

Figure 4A:
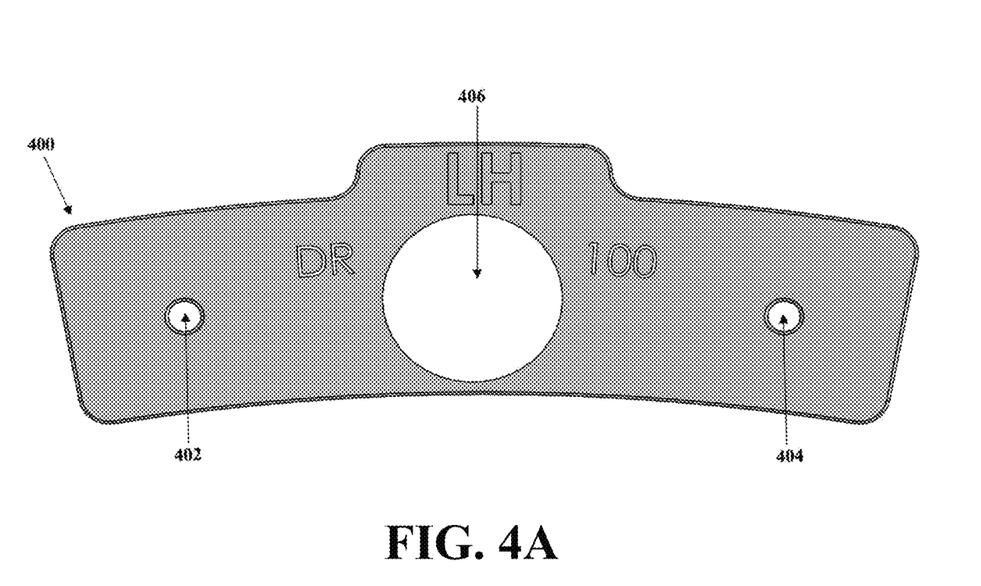
FIGS. 4A and 4B illustrate an exemplary perspective view of a first face and a second face of a back plate of a sprocket wear gauge respectively, according to one or more embodiments described herein.
Figure 4B:
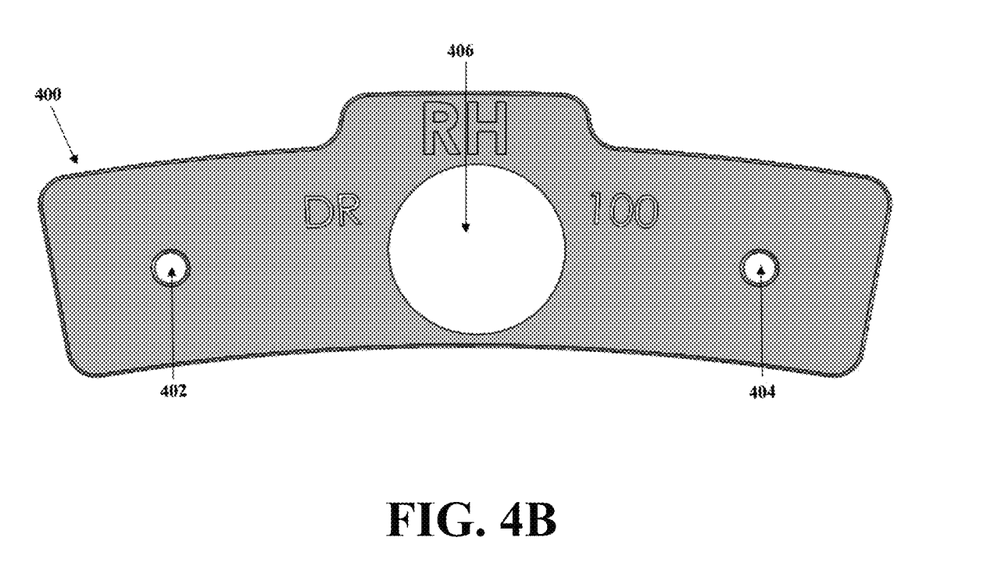

FIGS. 4A and 4B illustrate an exemplary perspective view of a first face and a second face of a back plate 400 of a sprocket wear gauge respectively, according to one or more embodiments described herein. The back plate 400 can further comprise an opening 406 and one or more holes 402, 404 to receive one or more screws. The opening 406 of the back plate 400 can be configured to be offset to a right-hand side or a left-hand side from a center of the back plate 400 by a predetermined amount such that the back plate 400 can be turned around so that sprocket wear and damage on a left-hand side and a right-hand side of the plurality of sprocket teeth can be visible.

In some embodiments, a plurality of rollers of a roller chain can be configured to engage with a plurality of sprocket teeth of the sprocket wheel, such that the sprocket wear and damage is caused on a left-hand side of the plurality of sprocket teeth. The back plate 400 can be configured to be used such that the opening 406 is offset to the left-hand side from the center of the back plate 400 by the predetermined amount. The opening 406 can be configured to view the sprocket wear and damage caused on the left-hand side of the plurality of sprocket teeth, as is disclosed by FIG. 4A. In some other embodiments, a front plate of the sprocket wear gauge can remain in a same position and orientation when the back plate 400 is turned over.

In some embodiments, the plurality of rollers of the roller chain can be configured to engage with the plurality of sprocket teeth of the sprocket wheel, such that the sprocket wear and damage is caused on a right-hand side of the plurality of sprocket teeth. The back plate 400 can be configured to be turned over such that the sprocket wear and damage caused on the right-hand side of the plurality of sprocket teeth can be visible through the opening 406, as is disclosed by FIG. 4B.

In some embodiments, the predetermined amount of offset to the right-hand side or the left-hand side from the center of the back plate 400 of wear can determine a percentage sprocket wear of the two sprocket teeth. In other embodiments, the percentage sprocket wear can be one or more of 100 percent sprocket wear, 75 percent sprocket wear, 50 percent sprocket wear and 25 percent sprocket wear or some value in between.

Figure 5A:
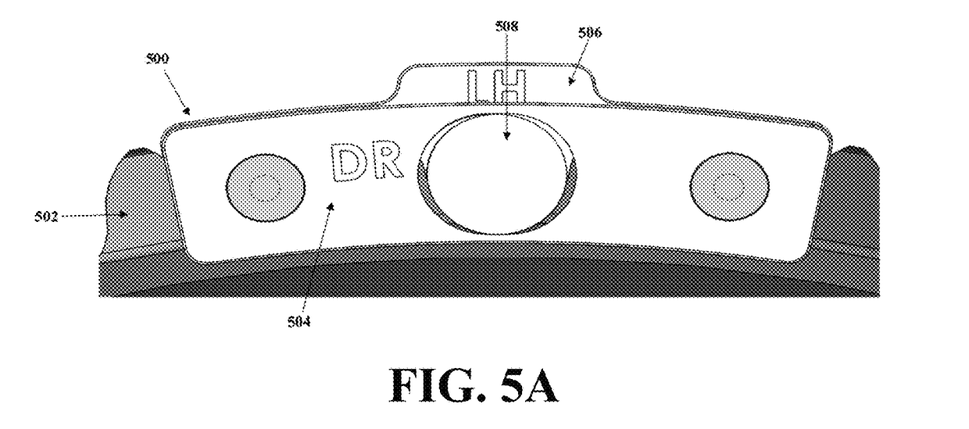
FIG. 5A illustrates an exemplary perspective view of a sprocket wear gauge mounted on a sprocket wheel having symmetrical sprocket teeth, according to one or more embodiments described herein.

FIG. 5A illustrates an exemplary perspective view of a sprocket wear gauge 500 mounted on a sprocket wheel having symmetrical sprocket teeth, according to one or more embodiments described herein. The sprocket wear gauge 500 comprises a first plate 504 having a first opening 508 and a second plate 506. The second plate 506 can comprise a second opening which coincides with the first opening 508 of the first plate 504 when the first plate 504 and the second plate 506 are placed on opposite ends of adjacent sprocket teeth of a plurality of sprocket teeth such as 502 of the sprocket wheel. Further, the first plate 504 can be configured to be placed at one end of the adjacent sprocket teeth such that the first opening 508 coincides with a gap between two of the adjacent sprocket teeth of the plurality of sprocket teeth such as 502. The first plate 504 can be placed such that the first opening 508 is equidistant from the two adjacent sprocket teeth. The diameter of the first opening 508 of the first plate 504 can be greater than a distance between the two adjacent sprocket teeth. The first plate 504 and the second plate 506 can be placed such that the first plate 504 and the second plate 506 are aligned to each other.

A visual inspection of the first opening 508 of the first plate 504 can be carried out to determine if the plurality of sprocket teeth such as 502 of the sprocket wheel have experienced a predetermined amount of wear yet. If the visual inspection of the first opening 508 of the first plate indicates that identical portions of the two of the adjacent sprocket teeth are visible through the first opening 508 of the first plate 504, it can be determined that the two adjacent sprocket teeth are symmetrical and have not yet experienced the predetermined amount of wear.

Figure 5B:
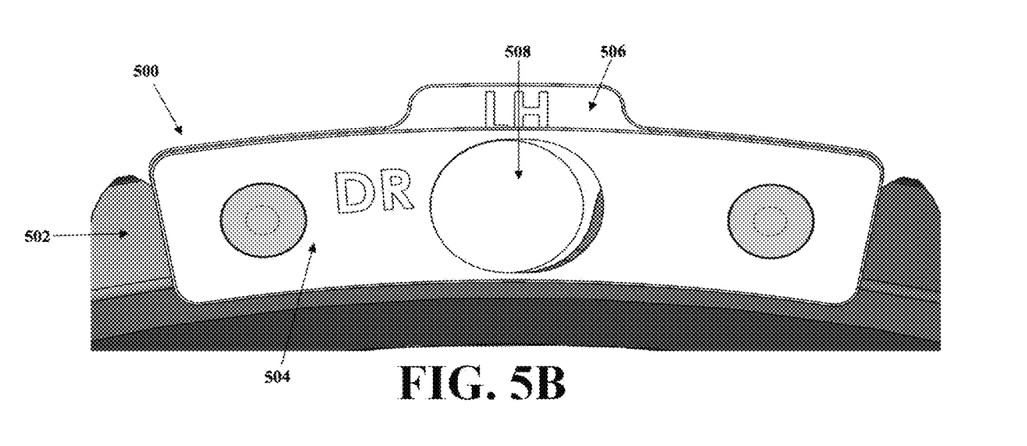
FIG. 5B illustrates an exemplary perspective view of the sprocket wear gauge mounted on a sprocket wheel having asymmetrical sprocket teeth, according to one or more embodiments described herein.

If the visual inspection of the first opening 508 of the first plate indicates that the portions of the two of the adjacent sprocket teeth that are visible through the first opening 508 of the first plate 504 are not identical, it can be determined that the two adjacent sprocket teeth are asymmetrical and have experienced the predetermined amount of wear, as is disclosed by FIG. 5B, which illustrates an exemplary perspective view of the sprocket wear gauge 500 mounted on a sprocket wheel having asymmetrical sprocket teeth, according to one or more embodiments described herein.

In some embodiments, if the visual inspection of the first opening 508 of the first plate indicates that one or more portions of the two of the adjacent sprocket teeth are not visible through the first opening 508 of the first plate 504, it can be determined that the two adjacent sprocket teeth have experienced the predetermined amount of wear.

Figure 6A:
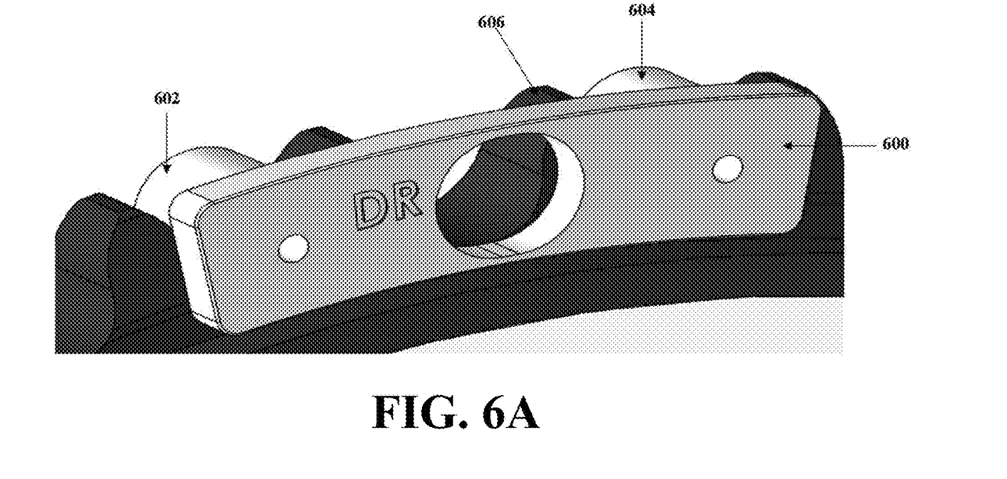
FIG. 6A illustrates an exemplary perspective view of a first face of a first plate of a sprocket wear gauge mounted on a sprocket wheel, according to one or more embodiments described herein.
Figure 6B:
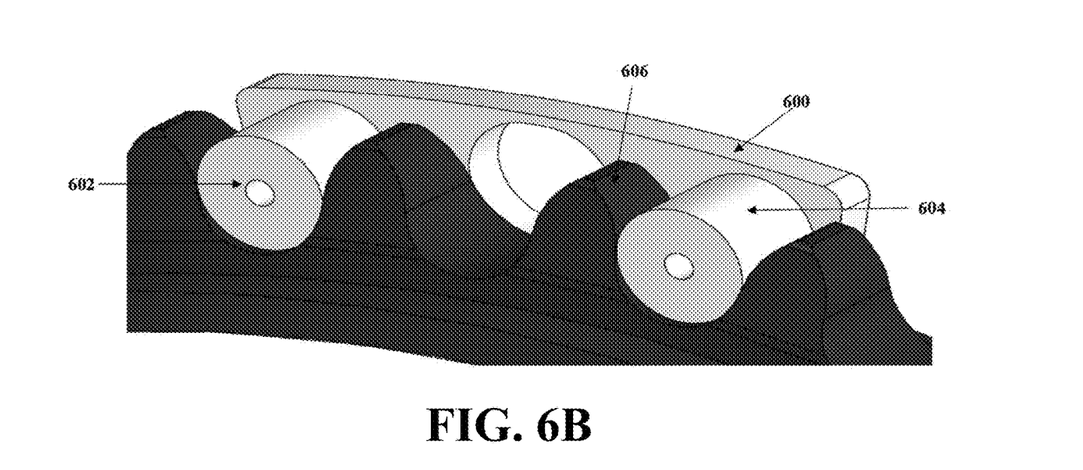
FIG. 6B illustrates an exemplary perspective view of a second face of the front plate of the sprocket wear gauge mounted on the sprocket wheel, according to one or more embodiments described herein.

FIG. 6A illustrates an exemplary perspective view of a first face of a first plate 600 sprocket wear gauge mounted on a sprocket wheel, according to one or more embodiments described herein. FIG. 6B illustrates an exemplary perspective view of second face of the first plate 600 of the sprocket wear gauge mounted on the sprocket wheel, according to one or more embodiments described herein. The sprocket wheel can comprise a plurality of sprocket teeth such as 606. The first plate 600 can have one or more cylindrical extrusions such as 602, 604. Dimensions of the one or more cylindrical extrusions such as 602, 604 can be identical to dimensions of one or more rollers of a roller chain coming in contact with the plurality of sprocket teeth such as 606 of the sprocket wheel. The one or more cylindrical extrusions 602, 604 can be placed between adjacent sprocket teeth of the plurality of sprocket teeth such as 606, such that the first plate 600 of the sprocket wear gauge can be placed adjacent to a test area of the plurality of sprocket teeth such as 606 of the sprocket wheel.

In some embodiments, the first face of the first plate 600 sprocket wear gauge mounted on a sprocket wheel can be a front face of the first plate 600 and the second face of the first plate 600 can be a rear face of the first plate 600.

Figure 7A:
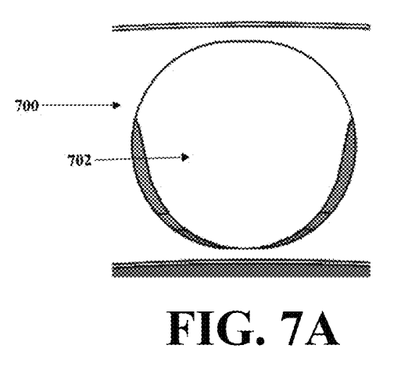
FIG. 7A illustrates an exemplary perspective view of a sprocket wear gauge without a cylindrical pin mounted Off between two sprocket teeth of a sprocket wheel, according to one or more embodiments described herein.

FIG. 7A illustrates an exemplary perspective view of a sprocket wear gauge 700 without a cylindrical pin, according to one or more embodiments described herein. The sprocket wear gauge 700 can comprise a first plate with a first opening and a second plate with a second opening. The sprocket wear gauge 700 can be mounted on a test area on a plurality of sprocket teeth of a sprocket wheel. The test area can comprise two sprocket teeth separated from each other by a predetermined gap 702. The first plate of the sprocket wear gauge 700 can be placed adjacent to one end of the plurality of sprocket teeth and the second plate of the sprocket wear gauge 700 can be placed adjacent to an opposite end of the plurality of sprocket teeth. The first opening of the first plate and the second opening of the second plate can be aligned to each other such that the first opening, the second opening, and the predetermined gap 702 between the two sprocket teeth have a common axis. In some embodiments, the diameter of the first opening of the first plate can be greater than a diameter of the second opening of the second plate. In other embodiments, the diameter of the first opening of the first plate and the diameter of the second opening of the second plate can be greater than the predetermined gap 702 between the two sprocket teeth. When the two sprocket teeth of the test area are symmetrical and have not yet experienced a predetermined amount of wear, identical portions of the two sprocket teeth can be visible through one or more of the first opening and the second opening, as is disclosed by FIG. 7A.

Figure 7B:
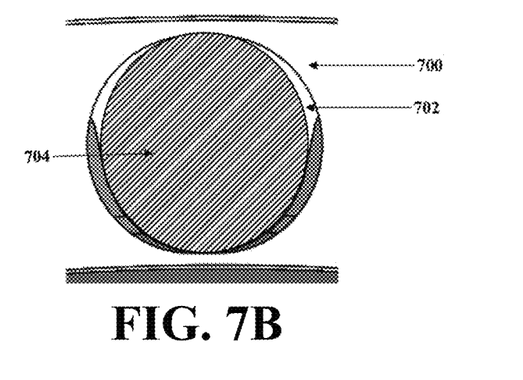
FIG. 7B illustrates an exemplary perspective view of the sprocket wear gauge with a cylindrical pin inserted between the two sprocket teeth of the sprocket wheel, according to one or more embodiments described herein.

FIG. 7B illustrates an exemplary perspective view of the sprocket wear gauge 700 with a cylindrical pin 704 inserted between the two sprocket teeth of the sprocket wheel, according to one or more embodiments described herein. The cylindrical pin 704 can be inserted such that it passes through the first opening of the first plate, the second opening of the second plate, and the predetermined gap 702 between the two sprocket teeth. The diameter of the cylindrical pin 704 can be equal to the predetermined gap 702 between the two sprocket teeth and less than the diameter of the first opening of the first plate and the second opening of the second plate. In some embodiments, the diameter of the cylindrical pin 704 can be less than the diameter of the first plate, the diameter of the second plate, and the predetermined gap 702 between the two sprocket teeth. When the two sprocket teeth of the test area are symmetrical and have not yet experienced the predetermined amount of wear, the cylindrical pin 704 can be placed in a center position between the two sprocket teeth of the sprocket wheel.

Figure 7C:
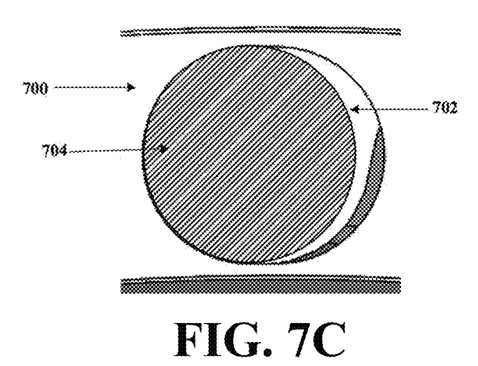
FIG. 7C illustrates an exemplary perspective view of the sprocket wear gauge with the cylindrical pin inserted between the two sprocket teeth of the sprocket wheel having wear on a left-hand side sprocket tooth of the two sprocket teeth, according to one or more embodiments described herein.

FIG. 7C illustrates an exemplary perspective view of the sprocket wear gauge 700 with the cylindrical pin 704 inserted between the two sprocket teeth of the sprocket wheel having wear on a left-hand side sprocket tooth of the two sprocket teeth, according to one or more embodiments described herein. The cylindrical pin 704 can come in contact with a periphery of the first opening of the first plate on a left-hand side when the left-hand side sprocket tooth of the two sprocket teeth has undergone the predetermined amount of wear. Further, the cylindrical pin can pass through the second opening of the second plate when the left-hand side sprocket tooth of the two sprocket teeth has undergone the predetermined amount of wear.

Figure 7D:
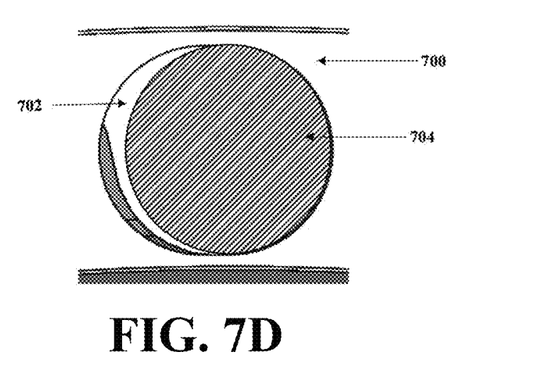
FIG. 7D illustrates an exemplary perspective view of the sprocket wear gauge with the cylindrical pin inserted between the two sprocket teeth of the sprocket wheel having wear on a right-hand side sprocket tooth of the two sprocket teeth, according to one or more embodiments described herein.

FIG. 7D illustrates an exemplary perspective view of the sprocket wear gauge 700 with the cylindrical pin 704 inserted between the two sprocket teeth of the sprocket wheel having wear on a right-hand side sprocket tooth of the two sprocket teeth, according to one or more embodiments described herein. The cylindrical pin 704 can come in contact with a periphery of the first opening of the first plate on a right-hand side when the right-hand side sprocket tooth of the two sprocket teeth has undergone the predetermined amount of wear. Further, the cylindrical pin can go through the second opening of the second plate when the right-hand side sprocket tooth of the two sprocket teeth has undergone a predetermined amount of wear.

In some embodiments, the predetermined amount of wear of the two sprocket teeth can be measured by an indentation depth caused by a plurality of rollers of a roller chain, wherein the plurality of rollers of the roller chain engage with the two sprocket teeth of a plurality of sprocket teeth of the sprocket wheel. In other embodiments, it can be determined that the sprocket wheel needs to be replaced when the indentation depth reaches a value which is equal to 10 percent of tooth width, wherein the tooth width is a width of a sprocket tooth of the plurality of sprocket teeth. In some other embodiments, other values of the indentation depth can be measured to determine if the sprocket wheel needs to be replaced. In yet some other embodiments, the predetermined amount of wear can be determined based on any other measure of sprocket wear and sprocket damage.

Figure 8A:
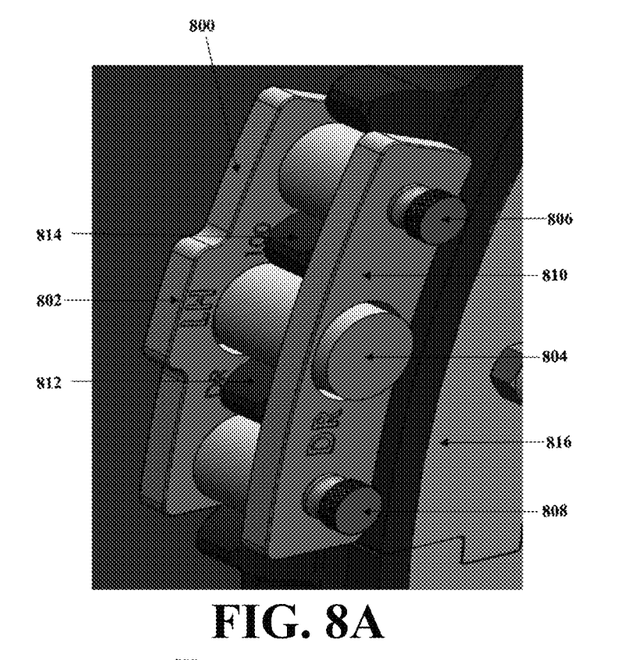
FIG. 8A illustrates an exemplary view of a sprocket wear gauge with a pin inserted between sprocket teeth of a sprocket wheel having no wear, according to one or more embodiments described herein.

FIG. 8A illustrates an exemplary exploded view of a sprocket wear gauge 800 with a pin 804 inserted between sprocket teeth 812, 814 of the sprocket wheel 816 having no wear, according to one or more embodiments described herein. The sprocket wear gauge 800 has a front plate 810 and a back plate 802, wherein the front plate 810 and the back plate 802 have a first opening of a first diameter and a second opening of a second diameter respectively. In some embodiments, the first diameter of the first opening can be greater than the second diameter of the second opening. In other embodiments, a distance between the sprocket teeth 812 and 814 can be less than the diameter of the first opening and the diameter of the second opening. In yet some other embodiments, diameter of the pin 804 can be less than the distance between the sprocket teeth 812 and 814. The front plate 810 and the back plate 802 can be attached to each other using one or more screws such as 806 and 808. The pin 804 can be inserted through the first opening of the front plate 810 such that the pin 804 is positioned between the sprocket teeth 812 and 814. When the sprocket teeth 812, 814 have no wear, the pin 804 can pass through the first opening of the front plate 810 and cannot pass through the second opening of the back plate 802.

Figure 8B:
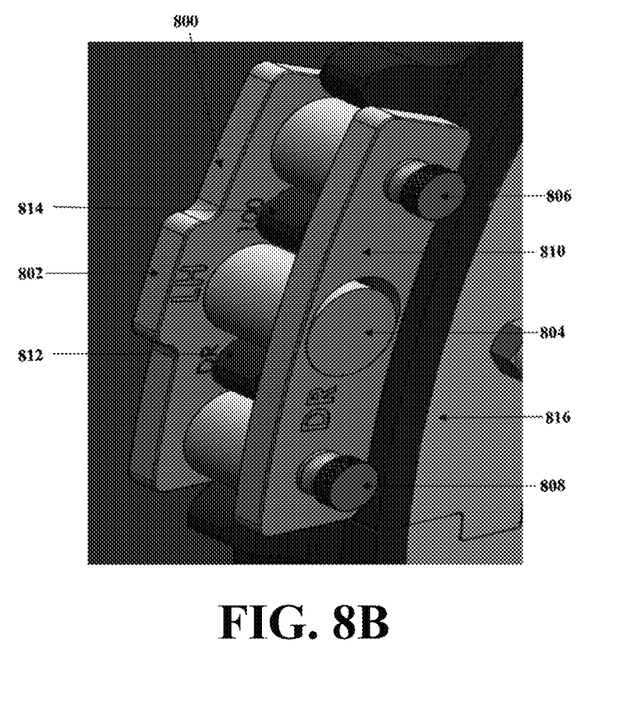
FIG. 8B illustrates an exemplary view of the sprocket wear gauge with the pin inserted between sprocket teeth of the sprocket wheel having a worn sprocket tooth, according to one or more embodiments described herein.

FIG. 8B illustrates an exemplary exploded view of the sprocket wear gauge 800 with a pin 804 inserted between a sprocket tooth 814 and a worn sprocket tooth 812 of the sprocket wheel 816, according to one or more embodiments described herein. Due to the worn sprocket tooth 812, the pin 804 can be inserted through the first opening of the front plate 810 and through the second opening of the back plate 802 such that the pin 804 passes through the sprocket tooth 814 and the worn sprocket tooth 812.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A device adapted to be mounted on a sprocket wheel comprising:
   a first plate comprising a first opening of a first diameter;
   a second plate comprising a second opening of a second diameter;
   a cylindrical pin configured to pass between adjacent teeth of a plurality of teeth of the sprocket wheel and through at least one of the first opening of the first plate and the second opening of the second plate, wherein a distance between the adjacent teeth of the plurality of teeth of the sprocket wheel is less than at least one of the first diameter and the second diameter.

2. The device of claim 1, wherein the cylindrical pin passing through the first opening of the first plate and the second opening of the second plate indicates that the plurality of teeth have experienced a predefined amount of wear.

3. The device of claim 1, wherein the cylindrical pin passing through the first opening of the first plate and not passing through the second opening of the second plate indicates that the plurality of teeth have not yet experienced a predefined amount of wear.

4. The device of claim 3, wherein the amount of wear of the adjacent teeth of the plurality of teeth of the sprocket wheel is calculated based on at least one parameter of the adjacent teeth of the plurality of teeth of the sprocket wheel.

5. The device of claim 4, wherein the at least one parameter of the adjacent teeth of the plurality of teeth of the sprocket wheel is a width of the adjacent teeth.

6. The device of claim 1, wherein the first diameter of the first opening of the first plate is equal to a distance between one or more adjacent worn sprocket teeth of the plurality of teeth of the sprocket wheel.

7. The device of claim 1, wherein the first diameter of the first opening and the second diameter of the second opening are equal.

8. The device of claim 1, wherein the first plate and the second plate comprise one or more holes through which one or more screws are inserted to secure the first plate and the second plate.

9. The device of claim 1, wherein the first plate and the second plate are identical in shape.

10. The device of claim 1, wherein an outer dimension of the first plate is identical to an outer dimension of the second plate.

11. The device of claim 1, wherein the first plate and the second plate are comprised of aluminum.

12. A method comprising:
placing a first plate having a first opening of a first diameter on one face of adjacent teeth of a plurality of teeth of a sprocket wheel;
placing a second plate having a second opening of a second diameter on an opposite face of the adjacent teeth of the plurality of teeth of the sprocket wheel;
configuring a pin to pass through at least one of the first opening of the first plate and the second opening of the second plate, wherein the pin is placed between the adjacent teeth of the plurality of teeth of the sprocket wheel, and wherein a distance between the adjacent teeth of the plurality of teeth of the sprocket wheel is less than at least one of the first diameter and the second diameter; and
replacing the sprocket wheel when the pin passes through the first opening of the first plate and the second opening of the second plate.

13. The method of claim 12, wherein the pin passing through the first opening of the first plate and the second opening of the second plate is indicative of a level of wear of the adjacent teeth of the plurality of teeth of the sprocket wheel.

14. The method of claim 13, wherein the level of wear of the adjacent teeth of the plurality of teeth of the sprocket wheel is calculated based on at least one parameter of the adjacent teeth of the plurality of teeth of the sprocket wheel.

15. The method of claim 14, wherein the at least one parameter of the adjacent teeth of the plurality of teeth of the sprocket wheel is a width of the adjacent teeth.

16. The method of claim 12, wherein the first diameter of the first opening of the first plate is equal to a distance between one or more adjacent worn sprocket teeth of the plurality of teeth of the sprocket wheel.

17. The method of claim 12, wherein the first diameter of the first opening and the second diameter of the second opening are equal.

18. The method of claim 12, wherein the first plate and the second plate comprise one or more holes through which one or more screws are inserted to secure the first plate and the second plate.

19. The method of claim 12, wherein the first plate and the second plate are identical in shape.

20. The method of claim 12, wherein one or more values associated with outer dimensions of the first plate are identical to one or more values associated with outer dimensions of the second plate.

* * * * *